United States Patent
Pflaum

(10) Patent No.: US 12,197,995 B2
(45) Date of Patent: Jan. 14, 2025

(54) HIGH-SPEED READING BY COMBINING TRANSMISSIVE WIDE ANGLE VIEW WITH REFLECTIVE FOCUS VIEW

(71) Applicant: Ceramic Data Solutions GmbH, Gmunden (AT)

(72) Inventor: Christian Pflaum, Bernried (DE)

(73) Assignee: Ceramic Data Solutions GmbH, Gmunden (AT)

( * ) Notice: Subject to any disclaimer, the term of this patent is extended or adjusted under 35 U.S.C. 154(b) by 0 days.

(21) Appl. No.: 18/558,510

(22) PCT Filed: May 11, 2022

(86) PCT No.: PCT/EP2022/062856
§ 371 (c)(1),
(2) Date: Nov. 1, 2023

(87) PCT Pub. No.: WO2022/243139
PCT Pub. Date: Nov. 24, 2022

(65) Prior Publication Data
US 2024/0242044 A1    Jul. 18, 2024

(30) Foreign Application Priority Data
May 17, 2021 (EP) .................................. 21174124

(51) Int. Cl.
| G06K 7/10 | (2006.01) |
| G02B 21/00 | (2006.01) |
| G02B 21/08 | (2006.01) |
| G02B 21/18 | (2006.01) |
| G02B 21/36 | (2006.01) |
| G06K 7/14 | (2006.01) |

(52) U.S. Cl.
CPC ..... *G06K 7/10544* (2013.01); *G02B 21/0004* (2013.01); *G02B 21/088* (2013.01); *G02B 21/18* (2013.01); *G02B 21/367* (2013.01); *G06K 7/1417* (2013.01)

(58) Field of Classification Search
CPC ............. G06K 7/10544; G06K 7/1417; G02B 21/0004; G02B 21/088; G02B 21/367
See application file for complete search history.

(56) References Cited

U.S. PATENT DOCUMENTS

| 3,918,803 A | 11/1975 | Friesem |
| 4,069,487 A | 1/1978 | Kasai et al. |

(Continued)

FOREIGN PATENT DOCUMENTS

| CN | 110653494 | 1/2020 |
| DE | 19724214 | 12/1998 |

(Continued)

OTHER PUBLICATIONS

Gustafsson, Mats G.L., "Nonlinear Structured-Illumination Microscopy: Wide-Field Fluorescence Imaging with Theoretically Unlimited Resolution," PNAS, vol. 102, No. 37, Sep. 13, 2005, pp. 13081-13086.

(Continued)

*Primary Examiner* — Matthew Mikels
(74) *Attorney, Agent, or Firm* — Lewis & Reese, PLLC

(57) ABSTRACT

The present invention relates to methods and devices for high-speed reading out information from an at least partially transparent data carrier.

20 Claims, 3 Drawing Sheets

(56) References Cited

U.S. PATENT DOCUMENTS

| | | | |
|---|---|---|---|
| 4,214,249 | A | 7/1980 | Kasai et al. |
| 4,394,661 | A | 7/1983 | Peeters |
| 4,397,923 | A | 8/1983 | Yasuda et al. |
| 4,556,893 | A | 12/1985 | Rinehart et al. |
| 4,797,316 | A | 1/1989 | Hecq et al. |
| 4,999,278 | A | 3/1991 | Bouldin |
| 5,063,556 | A | 11/1991 | Chikuma |
| 5,761,111 | A | 6/1998 | Glezer |
| 6,039,898 | A | 3/2000 | Glushko |
| 6,120,907 | A | 9/2000 | Tahon et al. |
| 6,133,986 | A | 10/2000 | Johnson |
| 6,143,468 | A | 11/2000 | Ohno et al. |
| 6,171,730 | B1 | 1/2001 | Kuroda et al. |
| 6,214,250 | B1 | 4/2001 | Moh et al. |
| 6,340,543 | B1 | 1/2002 | Nagamura et al. |
| 6,543,691 | B1 | 4/2003 | Lemelson et al. |
| 8,462,605 | B2 | 6/2013 | Ferren et al. |
| 10,181,336 | B1 | 1/2019 | Georgiou et al. |
| 10,315,276 | B2 | 6/2019 | Wagner et al. |
| 10,719,239 | B2 | 7/2020 | Rowstron et al. |
| 2002/0028015 | A1 | 3/2002 | Tack-Don et al. |
| 2002/0079297 | A1 | 6/2002 | Harrison |
| 2002/0164069 | A1 | 11/2002 | Nagano et al. |
| 2003/0186624 | A1 | 10/2003 | Koike et al. |
| 2003/0189228 | A1 | 10/2003 | Ieong et al. |
| 2004/0169847 | A1 | 9/2004 | Dukler |
| 2005/0181089 | A1 | 8/2005 | Ogawa et al. |
| 2005/0208392 | A1 | 9/2005 | Yamamoto |
| 2006/0044385 | A1 | 3/2006 | Wurm et al. |
| 2006/0119743 | A1 | 6/2006 | Lin |
| 2006/0120262 | A1 | 6/2006 | Kiyono |
| 2006/0147841 | A1 | 7/2006 | Ohmi et al. |
| 2006/0196945 | A1 | 9/2006 | Mendels |
| 2008/0238611 | A1 | 10/2008 | Costa et al. |
| 2008/0320205 | A1 | 12/2008 | Lunt et al. |
| 2009/0207395 | A1 | 8/2009 | Kasono |
| 2009/0245077 | A1 | 10/2009 | Ueda et al. |
| 2010/0040960 | A1 | 2/2010 | Piao et al. |
| 2010/0068444 | A1 | 3/2010 | Asplund et al. |
| 2010/0135147 | A1 | 6/2010 | Bard et al. |
| 2010/0151391 | A1 | 6/2010 | Neogi et al. |
| 2010/0289186 | A1 | 11/2010 | Longo et al. |
| 2011/0249137 | A1 | 10/2011 | Suzuki et al. |
| 2011/0318695 | A1 | 12/2011 | Hwang et al. |
| 2013/0273259 | A1 | 10/2013 | Depardieu et al. |
| 2014/0118529 | A1* | 5/2014 | Zheng .................. G21K 7/00 348/80 |
| 2015/0077535 | A1 | 3/2015 | Izatt et al. |
| 2015/0302926 | A1 | 10/2015 | Shiozawa et al. |
| 2015/0324677 | A1 | 11/2015 | Talyansky et al. |
| 2015/0382476 | A1 | 12/2015 | Zenou et al. |
| 2016/0088181 | A1 | 3/2016 | Chen et al. |
| 2016/0118077 | A1 | 4/2016 | Lunt et al. |
| 2016/0199935 | A1 | 7/2016 | Chen et al. |
| 2017/0160076 | A1 | 6/2017 | Miyazaki |
| 2018/0039806 | A1 | 2/2018 | Harrison |
| 2018/0130531 | A1 | 5/2018 | Ahner et al. |
| 2018/0246415 | A1 | 8/2018 | Xalter et al. |
| 2019/0273025 | A1 | 9/2019 | Chen et al. |
| 2019/0324240 | A1 | 10/2019 | Shroff et al. |
| 2019/0353912 | A1 | 11/2019 | Chen et al. |
| 2020/0075383 | A1 | 3/2020 | Minemura |
| 2020/0142171 | A1 | 5/2020 | Xiong et al. |

FOREIGN PATENT DOCUMENTS

| | | |
|---|---|---|
| DE | 102014118497 | 6/2017 |
| EP | 2157533 | 2/2010 |
| EP | 3109058 | 12/2016 |
| EP | 3031785 | 10/2018 |
| EP | 3779987 | 2/2021 |
| EP | 3955248 | 2/2022 |
| EP | 4044182 | 8/2022 |
| JP | H02-215587 | 8/1990 |
| JP | H02-277689 | 11/1990 |
| JP | 2000089124 | 3/2000 |
| JP | 2002055282 | 2/2002 |
| JP | 2002-351055 | 3/2002 |
| JP | 2003-137677 | 5/2003 |
| JP | 2004-062981 | 2/2004 |
| JP | 3913319 | 5/2007 |
| JP | 2007-319921 | 12/2007 |
| JP | 6689067 | 4/2020 |
| KR | 20010112497 | 12/2001 |
| WO | 91/13440 | 9/1991 |
| WO | 99/45441 | 9/1999 |
| WO | 2000/073983 | 12/2000 |
| WO | 2021/028035 | 2/2021 |
| WO | 2022/002418 | 1/2022 |
| WO | 2022/002444 | 1/2022 |
| WO | 2022/033701 | 2/2022 |
| WO | 2022/033800 | 2/2022 |
| WO | 2022/037754 | 2/2022 |
| WO | 2022/171522 | 8/2022 |
| WO | 2022/194354 | 9/2022 |
| WO | 2022/228675 | 11/2022 |

OTHER PUBLICATIONS

Watanabe M., et al., "Three-Dimensional Optical Data Storage in Vitreous Silica," Japanese Journal of Applied Physics, JP, vol. 37, No. 12 B, part 02, Dec. 15, 1998.

Glezer, E. N., et al., "Three-Dimensional Optical Storage Inside Transparent Materials," Optics Letters, vol. 21, No. 24, Dec. 15, 1996, 3 pages.

Glezer E. N., et al., "Ultrafast-Laser Driven Micro-Explosions in Transparent Materials," Appl. Phys., Lett. 71 (7), Aug. 18, 1997, 3 pages.

Benton, David M., "Multiple Beam Steering Using Dynamic Zone Plates on a Micro-Mirror Array," Optical Engineering, 57 (7), 2018, 13 pages.

Qi, Z.B., et al., "A Comprehensive Study of the Oxidation Behavior of Cr2N and CrN Coatings," 544, 2013, pp. 515-520.

Webster's Ninth New Collegiate Dictionary; Merrian-Webster Inc.; Springfield, Mass, USA; 1990 (no month); excerpt p. 224.

"Glass Composition, Glass Types," retrieved Dec. 17, 2020 from website ://glassproperties.com/glasses.

A. Laskin et al., "Beam-shaping unit for micromachining," Proceedings of SPIE—The Int'l Soc. for Optical Eng'g (Sep. 2013).

Haight, Richard, et al., "High Resolution Material Ablation and Deposition with Femtosecond Lasers and Applications to Photomask Repair," Journal of Modern Optics, Nov. 10-Dec. 15, 2004, vol. 51, No. 16-18, pp. 2781-2796.

Morishige, Yukio, "High Accuracy Laser Mask Repair Technology Using ps UV Solid State Laser," Second International Symposium on Laser Precision Microfabrication, Proceedings of SPIE, vol. 4426, 2002, pp. 416-423.

Venketakrishnan, K., et al., "Laser Writing Techniques for Photomask Fabrication Using a Femtosecond Laser," Applied Physics A Materials Science & Processing, vol. 74, 2002, pp. 493-496.

Winter Tim: "Hybrid Microscope," Feb. 23, 2020, 2 pages, retrieved from the internet on Oct. 29, 2021 from <https://web.archive.org/web/20200223182954/www.hktimwinter.com/en/pInfo.aspx?n=20160 201602161645162>.

International Search Report and Written Opinion regarding corresponding PCT Application No. PCT/EP2022/062856, mailed Sep. 14, 2022.

Extended European Search Report regarding corresponding European Application No. 21174124.4, mailed Nov. 12, 2021.

* cited by examiner

HIGH-SPEED READING BY COMBINING TRANSMISSIVE WIDE ANGLE VIEW WITH REFLECTIVE FOCUS VIEW

INTRODUCTION

The present invention relates to methods and devices for high-speed reading out information from an at least partially transparent data carrier.

The applicant of the present invention has developed data carriers for long-term storage of information based on ceramic materials (see, e.g., WO 2021/028035). These data carriers may utilize a transparent ceramic material as described, e.g., in co-pending EP publication 3955248, the entire content of which is hereby incorporated in its entirety by reference. Moreover, the applicant has been able to substantially increase the data storage density by utilizing various encoding techniques disclosed, e.g., in co-pending PCT Publications WO2022/002418, WO2022/002444, WO2022/194354, WO2022/228675, and co-pending EP publication 4044182, the content of all of which is hereby incorporated in its entirety by reference. While the tiny structures of the encoded data may be decoded or read out using techniques such as structured illumination microscopy (SIM) or saturated structured illumination microscopy (SSIM), those techniques will typically allow for visualizing or imaging only a small fraction of the entire data carrier at a time. This makes it difficult to, e.g., quickly access the right subsection of the data carrier or to maneuver between different sections of the data carrier during the read out process.

It is thus an object of the present invention to provide methods and devices for high-speed reading out information from an at least partially transparent data carrier which, at least partially, address these issues.

SUMMARY

This object is achieved with a method according to claim 1. Said method is adapted for high-speed reading out information from an at least partially transparent data carrier and comprises the steps of illuminating an at least partially transparent data carrier from a first side through a high numerical aperture objective; imaging the at least partially transparent data carrier from a first side in reflection mode through the high numerical aperture objective in order to generate focus view data; imaging the at least partially transparent data carrier from a second, opposite side in transmission mode through a low numerical aperture objective in order to generate wide angle data; and combining the focus view data and the wide angle data in order to generate an image comprising a wide angle view of at least a section of the data carrier with a subsection of said image having a higher resolution then the rest of the image.

In essence, the present invention is based on the idea to utilize two different imaging techniques to generate a high resolution focus view of a subsection of the data carrier using, e.g., the techniques discussed above, on the one hand and a wide angle overview over a much larger section of the data carrier using, e.g., less advanced imaging techniques. Thus, a much larger portion of the data carrier may be imaged and, e.g., displayed while at the same time the relevant subsection is imaged and, e.g., displayed with a sufficiently high resolution to actually decode the data or display the data with sufficient accuracy. This allows to substantially increase the speed of reading out information compared to prior art techniques. While the specific read out speed will depend on both the actual optical layout of the device utilized for reading out the information and the layout of the data carrier, it is envisage to achieve read out speeds of greater than 10 MB/s.

While the at least partially transparent data carrier preferably is one of the ceramic data carriers disclosed in the applications mentioned above, the method of the present invention is generally suitable for any partially transparent data carrier which allows for imaging in both reflection mode and transmission mode. In other words, the encoded information should provide sufficient contrast in both reflection mode and transmission mode. For example, the information may be encoded by different portions of the data carrier being transparent and non-transparent. The non-transparent portions may be reflecting, absorbing or scattering light. Of course, the property of transparency need only be present for a certain wavelength or a certain wavelength range which is used for illumination.

Accordingly, illumination may take place using any known light source, with the wavelength spectrum of the light source being adapted to the partial transparency of the data carrier. It is particularly preferable to utilize a laser or LEDs for illuminating.

Imaging the at least partially transparent data carrier from the first and second sides in reflection and transmission modes, respectively, may be performed using any known imaging technique. However, in light of the fact that the present invention aims at reading out extremely small structures being possibly even smaller than the wavelength of the illuminating light, it is particularly preferable that imaging the at least partially transparent data carrier from the first side in reflection mode through the high numerical aperture objective utilizes structured illumination microscopy (SIM) or saturated structured illumination microscopy (SSIM). These techniques are known to the skilled person and may be employed in the context of the present invention without difficulties as the combination of the high resolution image with the wide angle image does not have any impact on the way how the high resolution image is taken or generated.

In order to further improve the resolution of the combined image, it is preferred that imaging the at least partially transparent data carrier from a second, opposite side in transmission mode through the low numerical aperture objective utilizes Fourier ptychography. This technique is also well-known and allows for achieving rather high resolution wide angle images by combining various images with the sample being illuminated from different angles in Fourier space.

Preferably, the low numerical aperture objective has a numerical aperture of less than 0.3, more preferably less than 0.2 and most preferably less than 0.1. Preferably the high numerical aperture objective has a numerical aperture of at least 0.7, more preferably at least 0.8 and most preferably at least 0.9.

The subsection of the image having a higher resolution is preferably arranged in the center of the image.

Preferably, the resolution of the subsection of the image is by at least a factor of 5, more preferably 10, most preferably 15 greater than the resolution of the rest of the image.

Preferably, the ratio between the area of the entire image and the area of the subsection of the image is at least 100, more preferably at least 300, most preferably at least 1000.

Preferably, the at least partially transparent data carrier is illuminated by means of a digital micromirror device (DMD) and/or a spatial light modulator (SLM). The use of such a DMD, for example, allows for creating certain illumination patterns required for SIM, SSIM or Fourier ptychography.

As mentioned above, the inventive method is suitable for any at least partially transparent data carrier. It is, however, in particular envisaged to utilize the present invention for a data carrier comprising a ceramic substrate and a, preferably ceramic, coating layer, wherein the material of this ceramic substrate is different from the material of the coating layer. Preferably, the coating layer has a thickness no greater than 10 µm, more preferably no greater than 1 µm, even more preferably no greater than 100 nm and most preferably no greater than 10 nm. Preferably, the thickness of the ceramic substrate is at most 300 µm, preferably at most 200 µm, more preferably at most 150 µm, most preferably at most 100 µm. Preferably, the ceramic substrate comprises at least 90%, more preferably at least 95%, by weight of one or a combination of: a metal oxide such as $Al_2O_3$, $TiO_2$, $SiO_2$, $ZrO_2$, $ThO_2$, MgO, $Cr_2O_3$, $Zr_2O_3$, $V_2O_3$; a metal nitride such as CrN, CrAlN, TiN, TiCN, TiAlN, ZrN, AlN, VN, $Si_3N_4$, ThN, HfN, BN; a metal carbide such as TiC, CrC, $Al_4C_3$, VC, ZrC, HfC, ThC, $B_4C$, SiC; a metal boride such as $TiB_2$, $ZrB_2$, $CrB_2$, $VB_2$, $SiB_6$, $ThB_2$, $HfB_2$, $WB_2$, $WB_4$; and a metal silicide such as $TiSi_2$, $ZrSi_2$, $MoSi_2$, $WSi_2$, PtSi, $Mg_2Si$. Preferably, the coating layer comprises at least one of: a metal nitride such as CrN, CrAlN, TIN, TiCN, TiAlN, ZrN, AlN, VN, $Si_3N_4$, ThN, HfN, BN; a metal carbide such as TiC, CrC, $Al_4C_3$, VC, ZrC, HfC, ThC, $B_4C$, SiC; a metal oxide such as $Al_2O_3$, $TiO_2$, $SiO_2$, $ZrO_2$, $ThO_2$, MgO, $Cr_2O_3$, $Zr_2O_3$, $V_2O_3$; a metal boride such as $TiB_2$, $ZrB_2$, $CrB_2$, $VB_2$, $SiB_6$, $ThB_2$, $HfB_2$, $WB_2$, $WB_4$; or a metal silicide such as $TiSi_2$, $ZrSi_2$, $MoSi_2$, $WSi_2$, PtSi, $Mg_2Si$. Preferably, the ceramic substrate is transparent to the wavelength of the illuminating light. Preferably, the ceramic substrate comprises a glassy transparent ceramic material or a crystalline ceramic material and/or the ceramic substrate comprises one or a combination of: sapphire ($Al_2O_3$), silica ($SiO_2$), zirconium silicate ($Zr(SiO_4)$), zirconium dioxide ($ZrO_2$).

The ceramics based data carriers mentioned above and methods of manufacturing the same are described in more detail in PCT Publications WO 2021/028035, WO 2022/002418, WO 2022/002444, WO 2022/194354, WO 2022/228675, and EP Publications 3955248 and 4044182, the content of all of which is hereby incorporated in its entirety by reference.

The present invention further relates to a device for high-speed reading out information from an at least partially transparent data carrier. The device comprises a substrate holder for mounting an at least partially transparent data carrier; a high numerical aperture objective on a first side of the substrate holder; a low numerical aperture objective on a second, opposite side of the substrate holder; a light source for illuminating an at least partially transparent data carrier mounted on the substrate holder from the first side through the high numerical aperture objective; a first image detector for imaging the at least partially transparent data carrier from the first side in reflection mode through the high numerical aperture objective in order to generate focus view data; a second image detector for imaging the at least partially transparent data carrier from the second side in transmission mode through the low numerical aperture objective in order to generate wide angle data; and a central processing unit adapted and arranged for combining the focus view data and the wide angle data received from the first and second image detectors in order to generate an image comprising a wide angle view of at least a section of the data carrier with a subsection of said image having a higher resolution than the rest of the image.

Of course, all features discussed above with respect to the inventive method may be analogously employed in the context of the inventive device.

Preferably, a digital micromirror device and/or a spatial light modulator (SLM) is arranged between the light source and the high numerical aperture objective.

The first and second image detectors may, e.g., be CCD cameras or CMOS adapted for capturing light in the wavelength range of illumination.

The device may further comprise a mechanism for moving the focus view of either or both of the objectives relative to the data carrier (i.e., within the focal plane). This may be achieved by optical means and/or by a moving stage. For example, the substrate holder may comprise or may be positioned on an XY-stage for moving the data carrier along two directions within one plane. Said XY-stage may be motorized and may be manipulated manually or automatically. For example, suitable software may allow a user to choose a certain area within the wide angle view he/she is interested in, which will then trigger the software to control the XY-stage in such a manner as to allow for generating focus view data of this chosen area.

In order to allow for identifying regions of interest (either manually or automatically) the data carrier may comprise orientation or registration markers. For example, specific patterns (such as the three square patterns in case of a QR code) may be distributed over the data carrier, which patterns will be visible in the wide angle view and may be utilized to provide orientation on the data carrier to a user or a software automatically navigating over the data carrier. These patterns may comprise any or a combination of vertical lines, horizontal lines, rectangles, squares, circles, dots, or any other geometrical pattern.

BRIEF DESCRIPTION OF THE DRAWINGS

The present invention will now be further illustrated with reference to the figures, which show.

DETAILED DESCRIPTION

Figure 1:
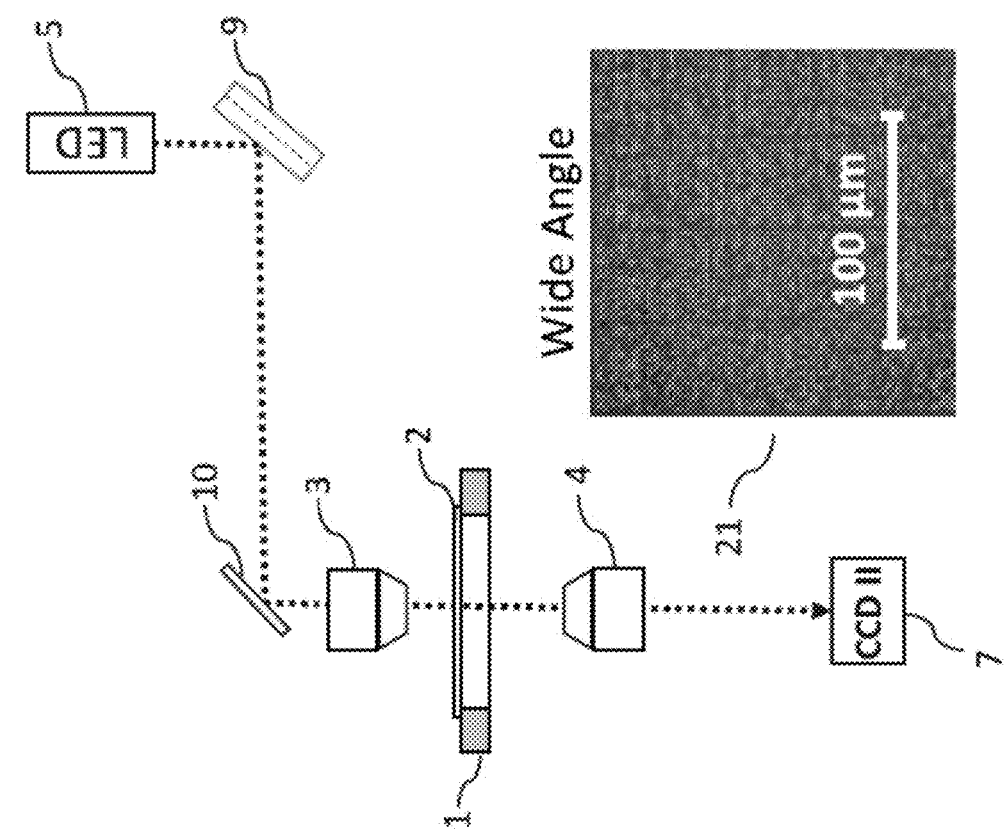
FIG. 1: a schematic of an optical setup for generating focus view data.

FIG. 1 schematically shows an example of an optical setup for imaging an at least partially transparent data carrier 2 mounted on a substrate holder 1 in reflection mode in order to generate focus view data 20. The at least partially transparent data carrier 2 is illuminated from a first side (here: a top side) through a high numerical aperture objective 3 by means of an LED 5 and a digital micromirror device 9. Of course, another light source may be utilized and the digital micromirror device is not necessarily required for generating focus view data. Moreover, a spatial light modulator may be utilized instead of the DMD 9. Light being reflected or scattered by the data carrier 2 can be imaged from the first side (here: the top side) in reflection mode through the same high numerical aperture objective 3 by means of, e.g., a CCD camera 6 and a semi-transparent mirror 10. This imaging technique generates focus view data 20 schematically illustrated at the bottom of FIG. 1. The exemplary focus view data 20 shown in FIG. 1 have been generated by an Olympus BX 51 with 100× microscope objective with an NA of 0.7. The sample shown is a ceramic material comprising circular recesses generated by laser pulses.

Figure 2:
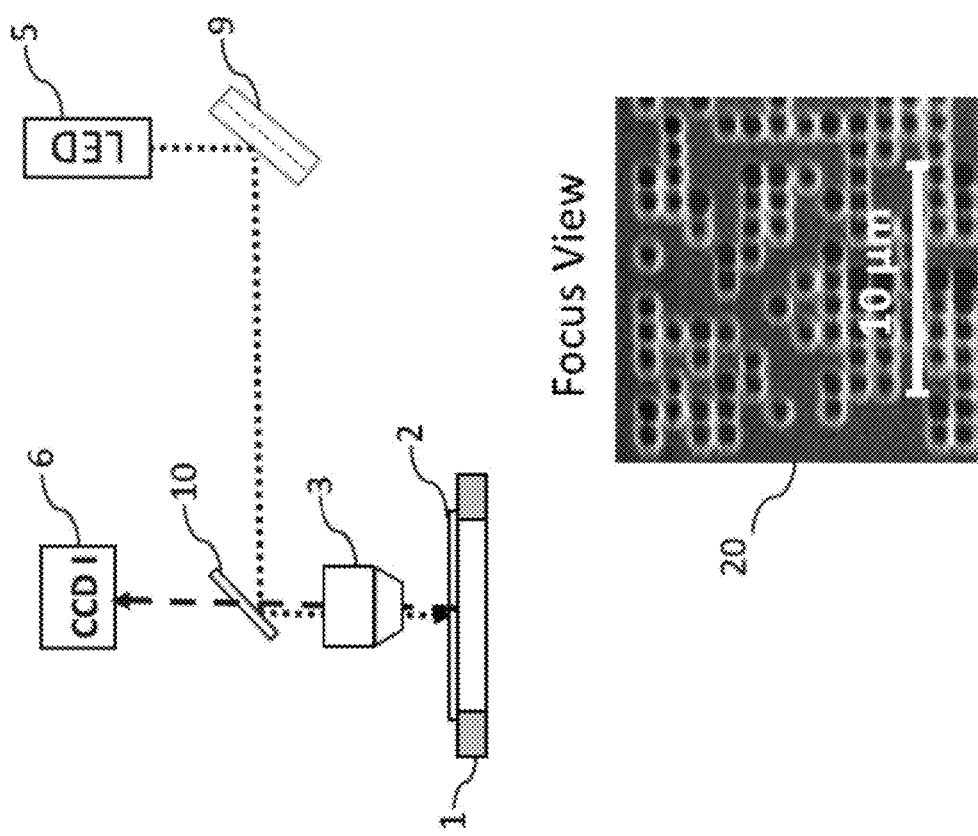
FIG. 2: a schematic of an optical setup for generating wide angle data.

FIG. 2 schematically shows an example of an optical setup for generating wide angle data 21. The data carrier 2 being mounted on the substrate holder 1 is again illuminated from a first side (here: the top side) through the high numerical aperture objective 3 by means of an LED 5, DMD 9 and the semi-transparent mirror 10 (which would not be required for this part of the setup). However, contrary to FIG. 1, in case of FIG. 2 imaging is performed from a second, opposite side (here: the bottom side) in transmission mode through a low numerical aperture objective 4 in order to generate wide angle data 21. Again, a CCD camera 7 or any other image detector may be utilized for imaging. The wide angle data shown at the bottom of FIG. 2 have been taken from the sample discussed above, utilizing an Olympus BX 51 with 10× microscope objective with an NA of 0.26.

According to the present invention the optical setups shown in FIGS. 1 and 2 are combined in a single device for high-speed reading out information from the at least partially transparent data carrier 2. This is exemplary shown in FIG. 3, where all components of FIGS. 1 and 2 have been combined accordingly. The setup allows for imaging the data carrier 2 from the first (top) side in reflection mode in order to generate focus view data and for imaging the data carrier 2 from a second, opposite (bottom) side in transmission mode in order to generate wide angle data. For both imaging steps, illumination can take place from the first, top side through the high numerical aperture objective 3.

Figure 3:
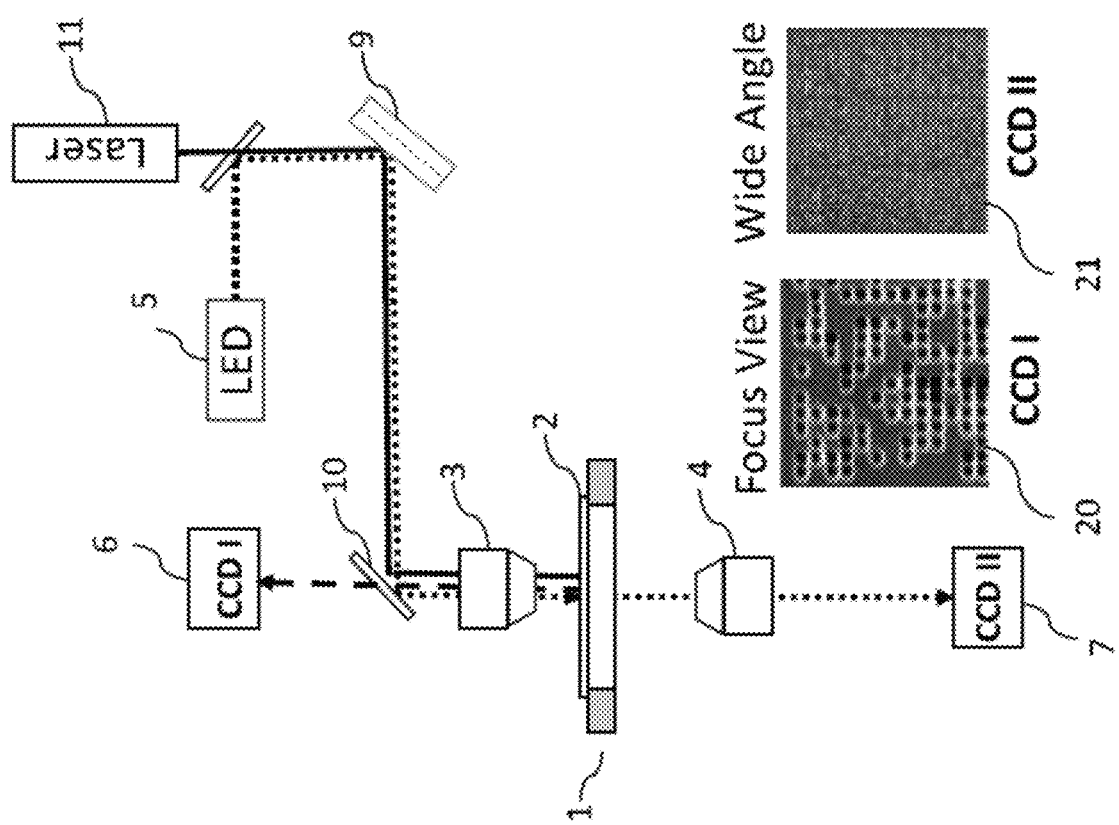
FIG. 3: a combination of the setups according to FIGS. 1 and 2.

While a very simple setup with only two CCD cameras 6 and 7 for imaging is shown in FIG. 3, it will be evident from the above discussion that either or both of the imaging components of the setup may be more elaborate utilizing, for example, SIM, SSIM and/or Fourier ptychography. For this purpose, the DMD 9 may generate specific illumination patterns required for those imaging techniques and an additional processing unit may be required in order to control the DMD 9 as well as the CCD cameras 6 and 7.

Of course, the setup shown in FIG. 3 may not only be used for reading out data from the data carrier 2, but could also be utilized for encoding data on the data carrier 2 using an additional laser 11. The encoding process has been described in detail in the above-mentioned patent applications and need not be further elucidated here.

Figure 4:
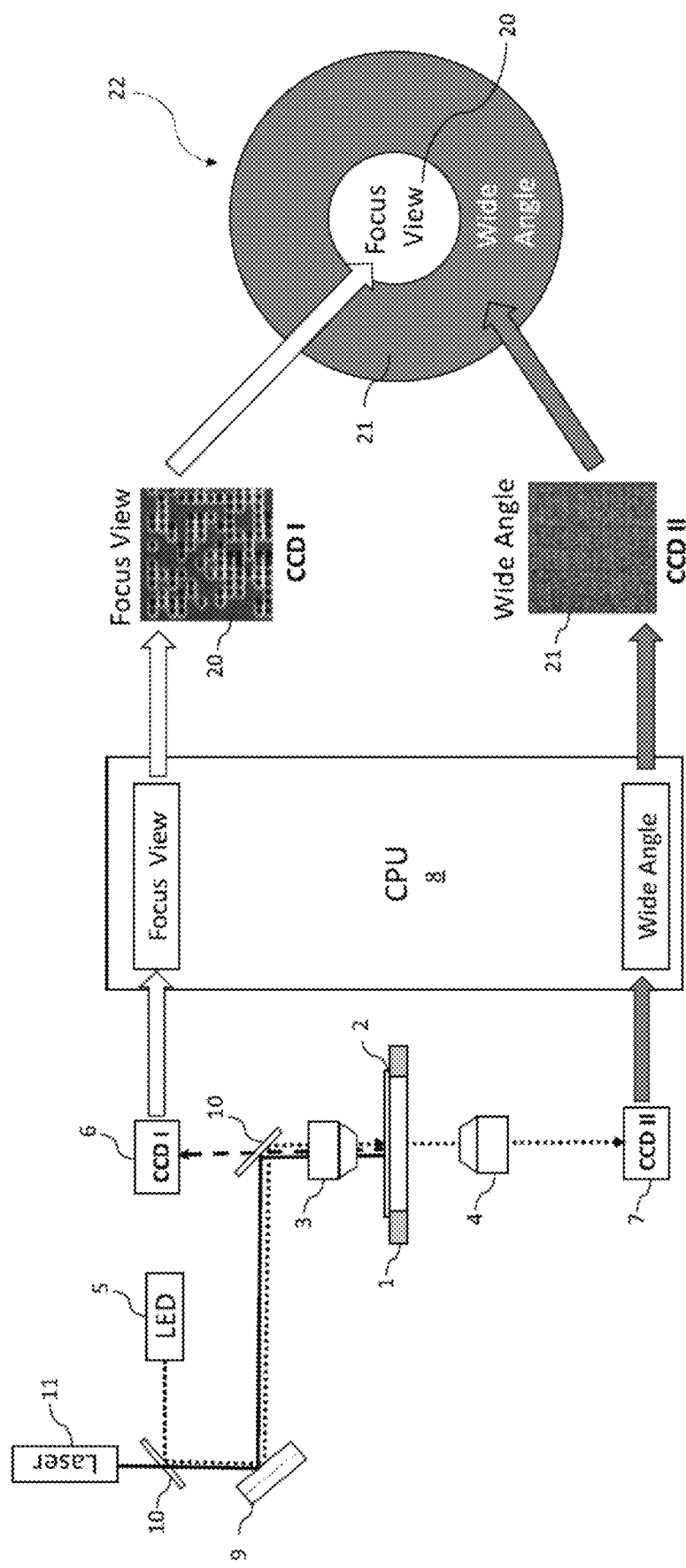
FIG. 4: a schematic of a preferred embodiment of a device according to the present invention.

The inventive method utilizing the above-discussed setup is schematically depicted in FIG. 4 which, on the left side, again shows the optical setup of FIG. 3 with an additional central processing unit (CPU) 8 being shown in the center of FIG. 4. Said CPU 8 receives the focus view data 20 from the CCD camera 6 as well as the wide angle data 21 from the CCD camera 7 and combines the data in order to generate an image 22 schematically depicted on the right side of FIG. 4. Said image 22 comprises a wide angle view 21 of at least a section of the data carrier 2 with a subsection 20 of said image having a higher resolution than the rest of the image. Of course, neither the image 22 nor the subsection 20 need be circular as shown in FIG. 4, but could also be rectangular, quadratic or of any other shape. It is, however, preferred that the subsection 20 of the image 22 is arranged in the center of the image 22 as shown in FIG. 4.

As should be evident from the above, the present invention allows for high-speed reading out information from an at least partially transparent data carrier because the resulting combined image 22 shown in FIG. 4 allows to generate both a broad overview over a large portion of the data carrier 2 and imaging the subsection with a resolution that is sufficient to decode the data or to image the data with the required accuracy. It will thus be possible to, e.g., shift the focus view to another part of the image 22 because the surrounding of the focus view is, albeit not with the same resolution, already visible in the image 22. The resolution of the rest of the image may, however, be great enough to visualize, for example, certain landmarks or orientation markers which will allow the user to identify certain regions on the data carrier which may be of interest to him. Thus, the claimed technique is extremely advantageous for quickly accessing data on a large data carrier encoding information with a high data density.

For shifting the focus view to another part of the image 22, the device may further comprise a mechanism for shifting the focus view of either or both of the objectives relative to the data carrier. This may be achieved by optical means and/or by a moving stage. For example, the substrate holder 1 may comprise or may be positioned on an XY-stage for moving the data carrier along two directions within one plane. Said XY-stage may be motorized and may be manipulated manually or automatically. For example, suitable software may allow a user to choose a certain area within the wide angle view he/she is interested in, which will then trigger the software to control the XY-stage in such a manner as to allow for generating focus view data of this chosen area.

In order to allow for identifying regions of interest (either manually or automatically) the data carrier may comprise orientation or registration markers. For example, specific patterns (such as the three square patterns in case of a QR code) may be distributed over the data carrier, which patterns will be visible in the wide angle view and may be utilized to provide orientation on the data carrier to a user or a software automatically navigating over the data carrier. However, depending on the data structure of the data carrier such orientation or registration markers may not be necessary in order to allow for navigating the data carrier. For example, if the data carrier contains image information, the wide angle view may already be sufficient to recognize the relevant portion of the image (even though the image in the wide angle view my be blurry) and to allow a user or a software to identify a region of interest to which the focus view will then be shifted in a next step. If the magnification for both the wide angle view and the focus view is known, then the required shift (e.g. for the XY-stage) in order to focus on the region of interest may be calculated without the presence of any markers.

The invention claimed is:

1. A method for high-speed reading out information from an at least partially transparent data carrier, the method comprising:
   illuminating the data carrier with an illuminating light from a first side through a first objective having a numerical aperture of at least 0.5;
   imaging the data carrier from the first side in a reflection mode through the first objective in order to generate focus view data, wherein imaging the data carrier in the reflection mode utilizes structured illumination microscopy (SIM) or saturated structured illumination microscopy (SSIM);
   imaging the data carrier from a second, opposite side in a transmission mode through a second objective having a numerical aperture of less than 0.3 in order to generate wide angle data; and combining the focus view data and the wide angle data in order to generate an image comprising a wide angle view of at least a section of the data carrier with a subsection of the image having a higher resolution than a rest of the image.

2. The method of claim 1, wherein the second objective has a numerical aperture of less than 0.2.

3. The method of claim 1, wherein the first objective has a numerical aperture of at least 0.7.

4. The method of claim 1, wherein the subsection of the image is arranged in a center of the image.

5. The method of claim 1, wherein a resolution of the subsection of the image is greater than a resolution of the rest of the image by at least a factor of 5.

6. The method of claim 1, wherein a resolution of the subsection of the image is greater than the resolution of the rest of the image by at least a factor of 10.

7. The method of claim 1, wherein the data carrier is illuminated by means of a digital micromirror device and/or a spatial light modulator.

8. The method of claim 1, wherein imaging the data carrier from the second, opposite side in the transmission mode through the second objective utilizes Fourier ptychography.

9. The method of claim 1, wherein the ceramic substrate comprises at least 90% by weight of one or a combination of: a metal oxide; a metal nitride; a metal carbide; a metal boride; or a metal silicide.

10. The method of claim 1, wherein the ceramic coating layer comprises one or a combination of: a metal nitride; a metal carbide; a metal oxide; a metal boride; or a metal silicide.

11. The method of claim 1, wherein the ceramic substrate is transparent to a wavelength of the illuminating light.

12. The method of claim 11, wherein the ceramic substrate comprises one or a combination of: sapphire ($Al_2O_3$); silica ($SiO_2$); zirconium silicate ($Zr(SiO_4)$); or zirconium dioxide ($ZrO_2$).

13. The method of claim 1, wherein the data carrier comprises orientation or registration markers.

14. A device for high-speed reading out information from an at least partially transparent data carrier, the device comprising:
a substrate holder for mounting the data carrier;
a first objective having a numerical aperture of at least 0.5 on a first side of the substrate holder;
a second objective having a numerical aperture of less than 0.3 on a second, opposite side of the substrate holder;
a light source for illuminating the data carrier mounted on the substrate holder from the first side through the first objective;
a spatial light modulator arranged between the light source and the first objective;
a first image detector for imaging the data carrier from the first side in a reflection mode through the first objective in order to generate focus view data;
a second image detector for imaging the data carrier from the second side in a transmission mode through the second objective in order to generate wide angle data; and
a central processing unit adapted to combine the focus view data and the wide angle data received from the first and second image detectors in order to generate an image comprising a wide angle view of at least a section of the data carrier with a subsection of the image having a higher resolution than a rest of the image.

15. The device of claim 14, wherein the second objective has a numerical aperture of less than 0.2.

16. The device of claim 14, wherein the first objective has a numerical aperture of at least 0.7.

17. The device of claim 14, further comprising a digital micromirror device arranged between the light source and the first objective.

18. A method for high-speed reading out information from an at least partially transparent data carrier, the method comprising:
illuminating the data carrier with an illuminating light from a first side through a first objective having a numerical aperture of at least 0.5, wherein the data carrier comprises a ceramic substrate and a ceramic coating layer, wherein a material of the ceramic substrate is different from a material of the coating layer, wherein the coating layer has a thickness no greater than 1 μm;
imaging the data carrier from the first side in a reflection mode through the first objective in order to generate focus view data;
imaging the data carrier from a second, opposite side in a transmission mode through a second objective having a numerical aperture of less than 0.3 in order to generate wide angle data; and
combining the focus view data and the wide angle data in order to generate an image comprising a wide angle view of at least a section of the data carrier with a subsection of the image having a higher resolution than a rest of the image.

19. The method of claim 18, wherein the ceramic substrate comprises at least 90% by weight of one or a combination of: a metal oxide; a metal nitride; a metal carbide; a metal boride; or a metal silicide, wherein the ceramic coating layer comprises one or a combination of: a metal nitride; a metal carbide; a metal oxide; a metal boride; or a metal silicide.

20. The method of claim 18, wherein imaging the data carrier from the first side in the reflection mode through the first objective utilizes structured illumination microscopy (SIM) or saturated structured illumination microscopy (SSIM).

\* \* \* \* \*